United States Patent [19]
Demaray

[11] Patent Number: 5,863,168
[45] Date of Patent: Jan. 26, 1999

[54] WASHER WITH A DETACHABLE EXTENSION

[76] Inventor: Eric Paul Demaray, 2013 Beaver Creek Dr., Daytona Beach, Fla. 32124

[21] Appl. No.: 903,645

[22] Filed: Jul. 31, 1997

[51] Int. Cl.$^6$ .............................. F16B 43/00; B23P 11/02
[52] U.S. Cl. ......................... 411/531; 411/169; 411/973; 29/525.11
[58] Field of Search .................................. 411/10, 88, 89, 411/98, 122, 169, 531, 532, 973; 29/525.02, 525.11

[56] References Cited

U.S. PATENT DOCUMENTS

| | | | |
|---|---|---|---|
| 133,694 | 12/1872 | Bishop | 411/98 |
| 1,058,139 | 4/1913 | Bartley | 411/122 |
| 1,498,686 | 6/1924 | Farnsworth | 411/973 X |
| 1,538,559 | 5/1925 | Johnson | 411/122 |
| 4,164,164 | 8/1979 | Trungold | 411/10 |

*Primary Examiner*—Neill R. Wilson
*Attorney, Agent, or Firm*—Robert L. Wolter, Esq.; Holland & Knight LLP

[57] ABSTRACT

A washer has an extension integrally attached to the washer. The extension is scored tangential the washer and extends across the width of the extension. Notches are formed in the extension so the extension tapers inward. The extension is detached from the washer by bending the extension back and forth lateral of washer, and until detached from the washer.

5 Claims, 1 Drawing Sheet

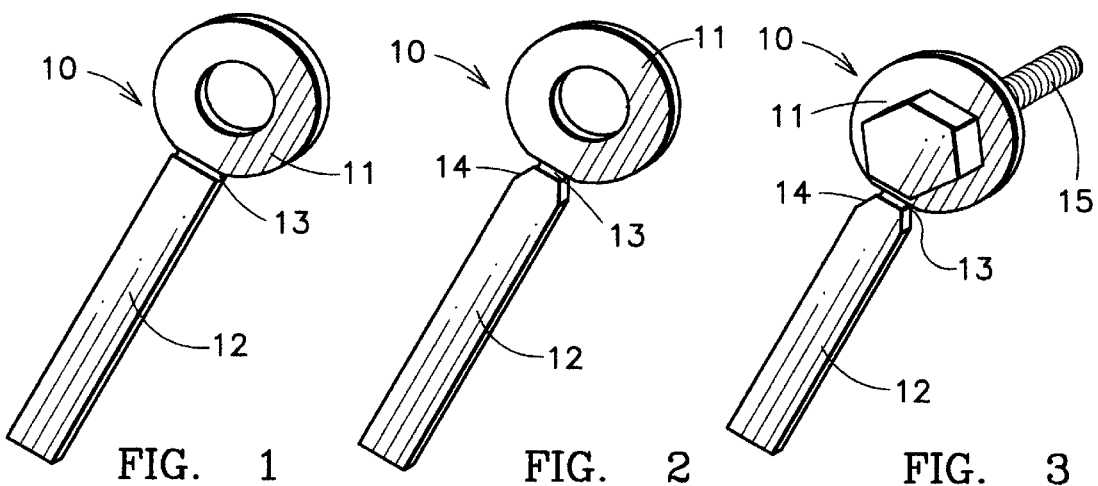
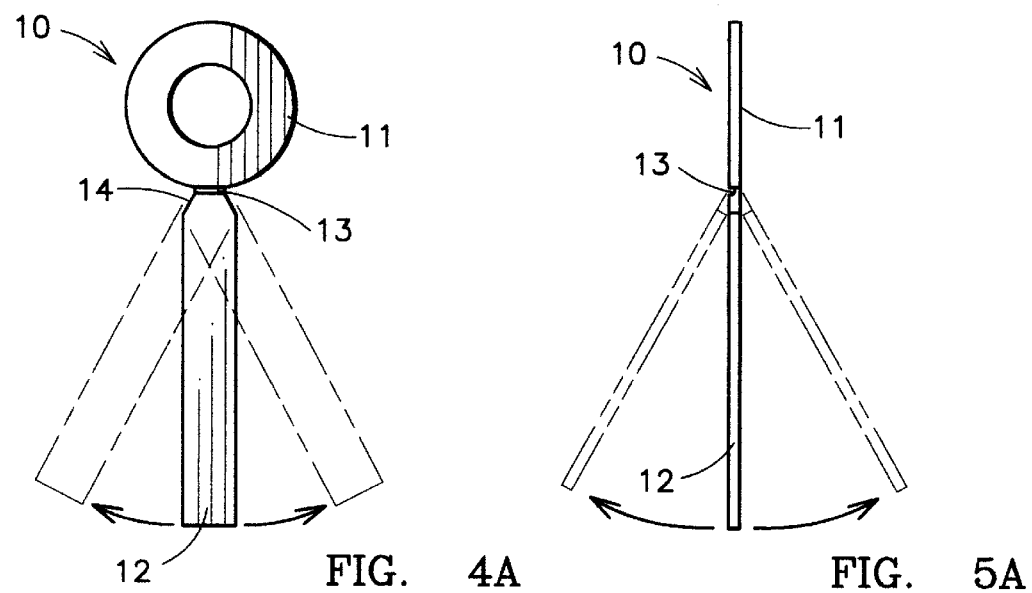
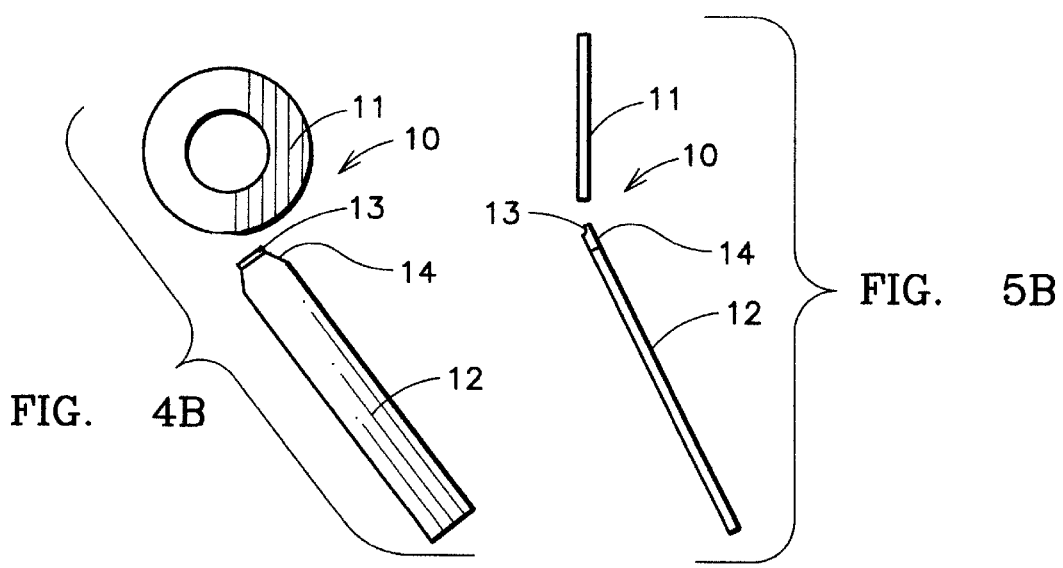

WASHER WITH A DETACHABLE EXTENSION

This invention generally relates to building and construction materials. More specifically, this invention pertains to washers and installation of the same.

BACKGROUND AND SUMMARY OF THE INVENTION

Washers are inserted between bolts, or screws, and building materials to ensure tightness, prevent leakage or relieve friction between the bolt and working piece. Often times the washers must be inserted in tight or hard to reach places, or the washer is simply awkward to handle with the bolt. Moreover, the screw or bolt must be aligned with the washer for proper installation.

Accordingly, it is an object of the present invention to provide a washer that is easy to handle and install. Another objective of the invention is to provide such a device that is convenient to use in tight work situations.

In order to accomplish the foregoing, a standard washer is integrally attached to an extension. The device is scored between the washer and extension so the extension may be bent with respect to the washer to detach the extension from the washer after the washer is installed.

BRIEF DESCRIPTION OF THE DRAWINGS

FIG. 1 is a perspective view of a first embodiment of the invention.

FIG. 2 is a perspective view of a second embodiment of the invention.

FIG. 3 is a perspective view of the invention with a bolt.

FIGS. 4A and 4B are views of the second embodiment of the invention with the extension being removed.

FIGS. 5A and 5B are side views of the invention with the extension being removed.

DETAILED DESCRIPTION OF THE DRAWINGS

The invention is designated as numeral 10 in the drawings, and includes a washer 11 with an extension 12 detachably secured to the washer 11. The washer 11 is not limited by a particular size or shape. The drawings illustrate a circular washer 11 having an opening through which a bolt or screw 15 is inserted.

The washer 11 and extension 12 are preferably stamped from a sheet metal so the extension 12 is integrally attached to the washer 11. In addition, the extension 11 has the same thickness as the washer 11, and is coplanar with the washer 11. A score 13 is formed in the extension 12 tangential to the washer 11. The score 13 extends across the width of the extension 12 to adequately detach the extension 12 from the washer 11.

In use, the washer 11 is held in position by the extension 12 until the bolt is inserted in the washer. The extension 12 is removed from the washer as shown in FIGS. 5A and 5B. The bolt 15 is driven to a firm position on a workpiece, securing the washer 11 intermediate the bolt and workpiece (not shown). After a bolt 15 is inserted through the washer 11 and driven into place, the extension 11 is bent back and forth lateral of the washer 11 along the score 13 until the extension 12 breaks from the washer 11.

A second embodiment of the invention is illustrated in FIGS. 4A and 4B. Notches 14 are formed at each end of the score 13 intermediate the extension 12 and the washer 11, so the extension tapers inward toward the washer 11. This embodiment may be used in areas that are difficult to reach for instance where the extension is difficult to bend back and forth to remove the extension 12. After the bolt 12 is secured in position through the washer 1, the extension bent side-to-side toward the notches 14 as shown in FIGS. 4A and 4B. This may break the extension from the washer 11 or weaken the score sufficiently so the extension 12 may be slightly bent lateral the washer 11 (as shown in FIGS. 5A and 5B) to detach the extension 11.

While I have disclosed the preferred embodiment of my invention, it is not intended that this description in any way limits the invention, but rather this invention should be limited only by a reasonable interpretation of the now recited claims.

Having thus described my invention, what I claim as new and desire to secure by Letters Patent is:

1. A device for use as a washer, comprising:

(a) a washer;

(b) an extension integrally attached to the washer; and, (c) means, extending intermediate the waster and extension, for detaching said extension from said washer wherein said detachment means includes a score formed in the extension tangential to the edge of the washer and a notch formed in the extension.

2. A device for use as a washer, comprising:

(a) a washer;

(b) an extension integrally attached to the washer, said extension coplanar with the washer; and, (c) a score formed in the extension extending tangentially along an edge of the washer and a notch formed in the extension adjacent said score.

3. A device for use as a washer, comprising:

(a) a washer having a first surface, a second surface and an edge extending intermediate the first and second surfaces;

(b) an extension integrally attached to the washer, said extension coplanar with the washer, and said extension having a first edge and a second edge parallel one another and each integral with the edge on the washer; and, (c) a score formed in the extension intermediate the extension and washer, extending tangential to the washer, said score extending from the first edge of the extension to the second edge of the extension and a notch formed on said first edge and second edge of the extension adjacent the score such that said extension tapers inward.

4. A method for installing a washer, comprising the steps of:

(a) providing a washer;

(b) integrally attaching an extension to the washer whereby said extension is coplanar with the washer;

(c) scoring the extension tangential to the washer;

(d) inserting a screw or bolt in the washer and securing the bolt or screw in position;

(e) bending the extension along the score, and laterally with respect to the washer, and pulling the extension until it detaches from the washer.

5. A method, as defined in claim 4, further including forming notches in the extension adjacent the scoring.

* * * * *